United States Patent
Volk

(10) Patent No.: US 7,175,518 B2
(45) Date of Patent: Feb. 13, 2007

(54) RETAINER FOR POULTRY HOCKS

(75) Inventor: Henry J. Volk, Turlock, CA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 11/376,444

(22) Filed: Mar. 15, 2006

(65) Prior Publication Data

US 2006/0183417 A1 Aug. 17, 2006

Related U.S. Application Data

(63) Continuation of application No. 10/934,252, filed on Sep. 3, 2004, now Pat. No. 7,014,553.

(51) Int. Cl.
*A22C 17/00* (2006.01)
(52) U.S. Cl. .................................................. 452/174
(58) Field of Classification Search ............... 452/172, 452/174, 176
See application file for complete search history.

(56) References Cited

U.S. PATENT DOCUMENTS

| | | | | |
|---|---|---|---|---|
| 3,895,415 A | * | 7/1975 | Volk | 452/174 |
| 4,051,573 A | * | 10/1977 | Volk | 452/174 |
| 4,615,075 A | * | 10/1986 | Volk | 452/174 |
| 4,653,146 A | * | 3/1987 | Volk | 452/174 |
| 4,739,538 A | * | 4/1988 | Volk | 452/174 |
| 5,279,519 A | * | 1/1994 | Volk | 452/174 |
| 5,292,277 A | * | 3/1994 | Volk et al. | 452/174 |
| 5,297,985 A | * | 3/1994 | Volk | 452/176 |
| 5,380,241 A | * | 1/1995 | Volk | 452/174 |
| 7,014,553 B1 | * | 3/2006 | Volk | 452/174 |

* cited by examiner

*Primary Examiner*—Thomas Price
(74) *Attorney, Agent, or Firm*—Laurence P. Colton; Powell Goldstein LLP

(57) ABSTRACT

A device for retaining and trussing the hocks of poultry carcass in juxtaposition and proximal to the body during processing, packaging, shipping, storage, and/or cooking. The present invention, including a hock retaining member, may be constructed of a unitary, plate-like member of resilient material and it includes two openings for fitting about and retaining the hocks, an anchor to be affixed to the poultry carcass, and a connecting member between the hock retaining member and the anchor. The connecting member provides a spring force to keep the hocks and thus the legs juxtaposed to the carcass and each other.

19 Claims, 12 Drawing Sheets

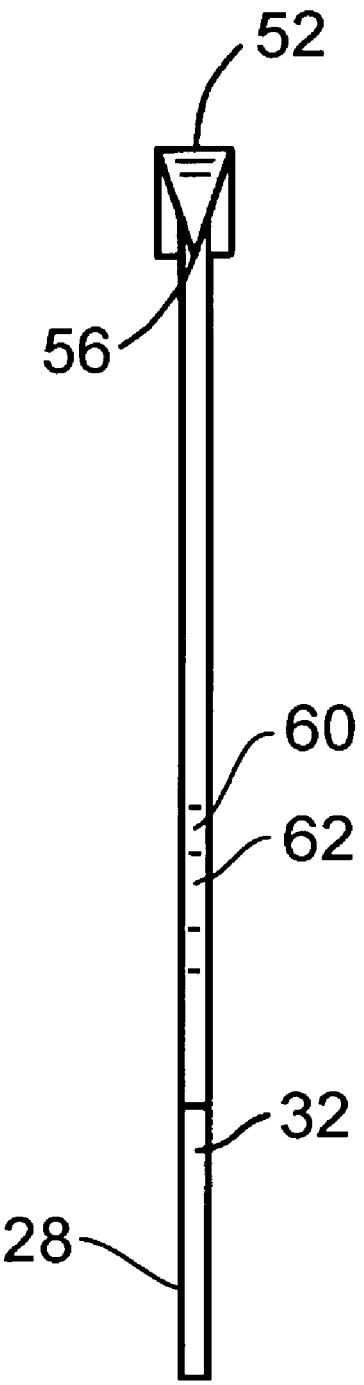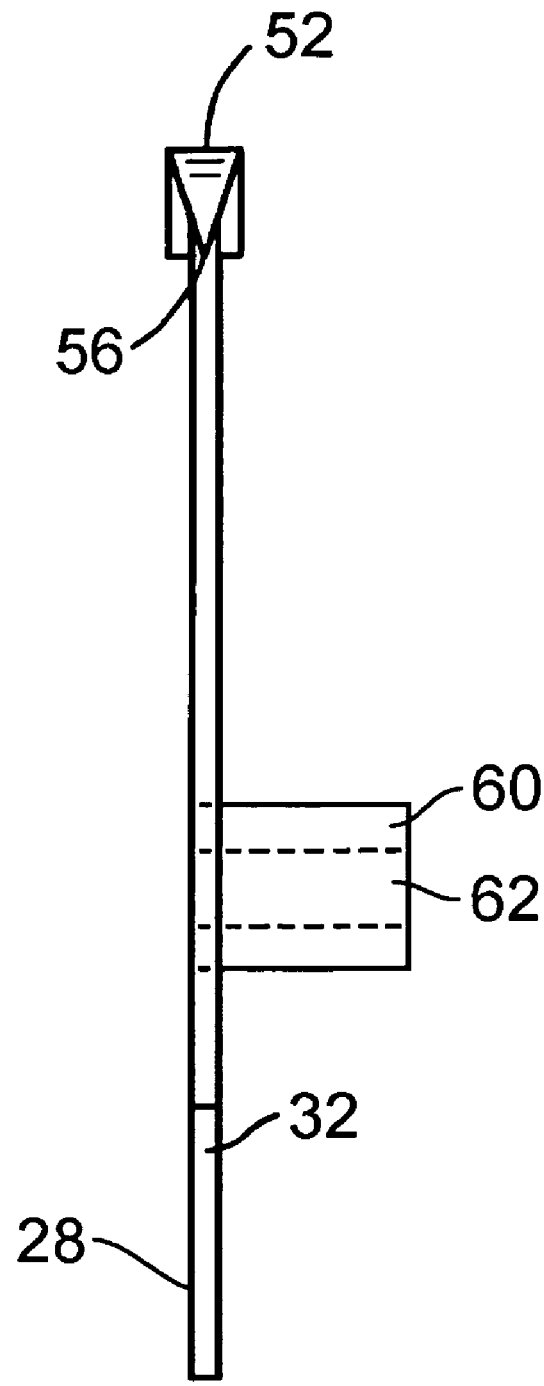
FIG. 4A  FIG. 4B

RETAINER FOR POULTRY HOCKS

CROSS REFERENCE TO RELATED APPLICATIONS

This patent application is a continuation of U.S. patent application Ser. No. 10/934,252 having a filing date of 3 Sep. 2004 now U.S. Pat. No. 7,014,553 and entitled Retainer For Poultry Hocks, currently pending and allowed, and assigned to Volk Enterprises, Inc. of Turlock, Calif.

BACKGROUND OF THE INVENTION

1. Technical Field

The present invention relates generally to a device for trussing or retaining the hocks of poultry carcasses and more particularly to a retainer that can engage the hocks of a poultry carcass to retain the legs in juxtaposition during processing, packaging, shipping and possibly cooking.

2. Prior Art

As is appreciated by those skilled in the art, the processing, packaging and shipping of poultry carcasses can be made easier by creating relative uniformity amongst trussed poultry carcasses. For example, if the hocks of poultry carcasses are protruding from the animal carcass, then the extending limbs can interfere with packaging machinery and tear the shrink-wrap. Trussing the hocks, thereby holding the legs together close to the body, can help to avoid this problem. Further, it is easier to cook a trussed poultry carcass, especially on a rotisserie, as the legs will be retained against the body and not flop about. Similarly, as the poultry carcasses can be cooked more easily, there is an added benefit of trussing poultry carcasses to consumers, and this can be exploited by advertising by the retailer.

Over the years, many brackets, clamps, retainers, and similar devices have been developed for retaining or trussing the hocks of poultry carcasses during cooking, shipping, and processing, some of metal and wire, but most of nylon or plastic. Not surprisingly, the prior art discloses many means for trussing the hocks of poultry carcasses. While the known prior art has advantages for certain situations, there is a constant need for poultry trussing devices that are less expensive to manufacture, are easier to mount on the hocks, are easier to dismount from the hocks, are less costly to ship, that hold the hocks more securely, and that can be mounted automatically if desired, or combinations of these. A few exemplary trussing devices are discussed below.

U.S. Pat. No. 5,102,370 to Volk discloses a hock cap covering the entire hock wherein such a hock cap has a figure-8 structure with an ankle strap having a lower portion that engages the back side of the ankles.

U.S. Pat. No. 5,112,274 to Volk discloses a snap-on ankle strap poultry-trussing device wherein the plastic ankle strap has a lower portion having an indent that extends upwardly between the exposed hocks of the carcass. The ankle strap is slipped over the exposed hocks, grasps the ankles of the poultry carcass, and holds them together.

U.S. Pat. No. 5,181,880 to Volk discloses a method of trussing poultry by making slits in the skin and passing the hocks through the slits and then attaching a snap-on hock cap to hold the hocks together.

U.S. Pat. No. 5,498,201 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the hocks in juxtaposition.

U.S. Pat. No. 5,735,736 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the legs substantially perpendicular to the retainer and parallel to each other.

U.S. Pat. No. 5,749,778 to Volk discloses a retainer for poultry hocks that is formed as a ring of a thin unitary plastic material. The ring has hinged flaps extending inward from opposite sides thereof. The poultry hocks are inserted through the ring to cause the flaps to bend outward and then to partially retract backward so that the edges of the flaps engage behind the hock knuckles, holding the thighs close to the body of the fowl. Preferably, either the ring or the flaps are cut away to increase the length of the hinge area.

The present invention is directed towards providing a hock retainer generally for trussing poultry carcasses and specifically for fitting about the hocks so as to hold the legs proximal to each other and to the body of the carcass. The present invention is also directed towards a relatively simple device that can be manufactured simply and inexpensively, and easily is mounted on and dismounted from the hocks automatically by machine or manually by personpower. The present invention further is directed towards a hock retainer that has less interaction or contact with packaging materials.

BRIEF SUMMARY OF THE INVENTION

Briefly described, the present invention is a device for retaining and trussing the hocks of a poultry carcass in juxtaposition and proximal to the body during processing, packaging, shipping, storage, and/or cooking. The new poultry trussing device can be used to hold the hocks of poultry in place for efficient processing. The invention has two openings to receive the hock portions of the poultry legs and may include a central first tab section above the openings. Some of the features of the device include (1) half-moon notches on the openings to receive the hocks of each poultry leg locked therein and (2) a first tab, or reinforced extension, that curves downward and positions itself around the inside of each leg.

A first end of the present invention has a hock retaining portion that receives and retains the tops of the hocks and a second end has an anchor that may be inserted into the cavity of the carcass or in the tail section of the carcass. In addition, the hock retaining portion is preferably rotatable. In use, the hock retaining means are rotated approximately 180°, the hocks are placed in the hock retaining means, and the hock retaining means are released. The hock retaining means attempt to return (rotate back) to their original position, thus locking the hocks. The half moon notches fit over the hocks with end-points fitting within the hock dimples, and the central tab fits between the ankles, thus helping to secure the hocks.

The present invention may be constructed as a unitary, plate-like member of resilient material. The retainer can be mounted on the hocks by a single upward or downward motion of the retainer over the hocks. As the retainer is placed, or snapped, over the hock, the hock is caught in the retainer. Because the hock receiving openings are juxtaposed and the hocks of the poultry carcass are loaded into the hock receiving openings, the loading of the hocks into the retainer conveniently juxtaposes the hocks proximal to each other.

The relatively simple mechanism for loading the retainer with the hocks of the poultry carcass can allow for efficient mounting by hand or by automation. Poultry processing workers use an upward or downward motion to mount the retainer onto the hocks. Alternatively, as the retainer can have a generally plate-like configuration, which is an optimal shape to be fitted in an automated poultry-processing machine, the retainer can be incorporated efficiently into an automated process or operation. A tab may be located on the retainer which tab may include a hole for use in an automated machine for placing the retainer on the poultry carcass. The retainer also can have a slot for mounting onto a supply bar either for storing a number of the retainers or for feeding the retainers into an automated retainer-mounting machine. Further, as the present invention has a generally simple structure, the device can be manufactured relatively easily and inexpensively and can be mounted quickly and efficiently on the hocks.

These features, and other features and advantages of the present invention, will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

FIG. 4A is a side view of the retainer of FIG. 3A/3B.

FIG. 4B is a side view of a preferred embodiment the present invention.

DETAILED DESCRIPTION OF THE PREFERRED EMBODIMENTS

Figure 1:
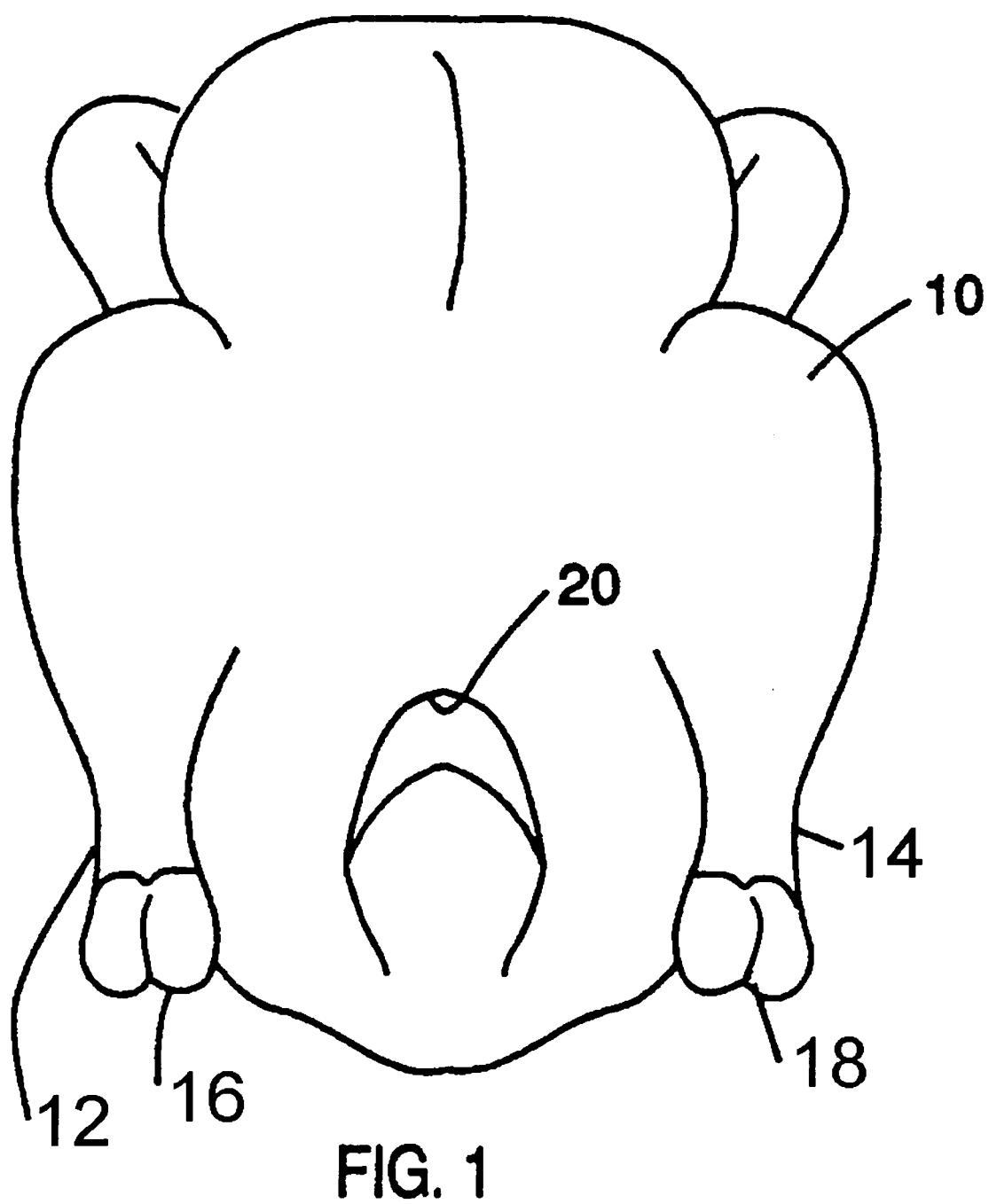
FIG. 1 is a perspective view of an eviscerated poultry carcass.
Figure 2:
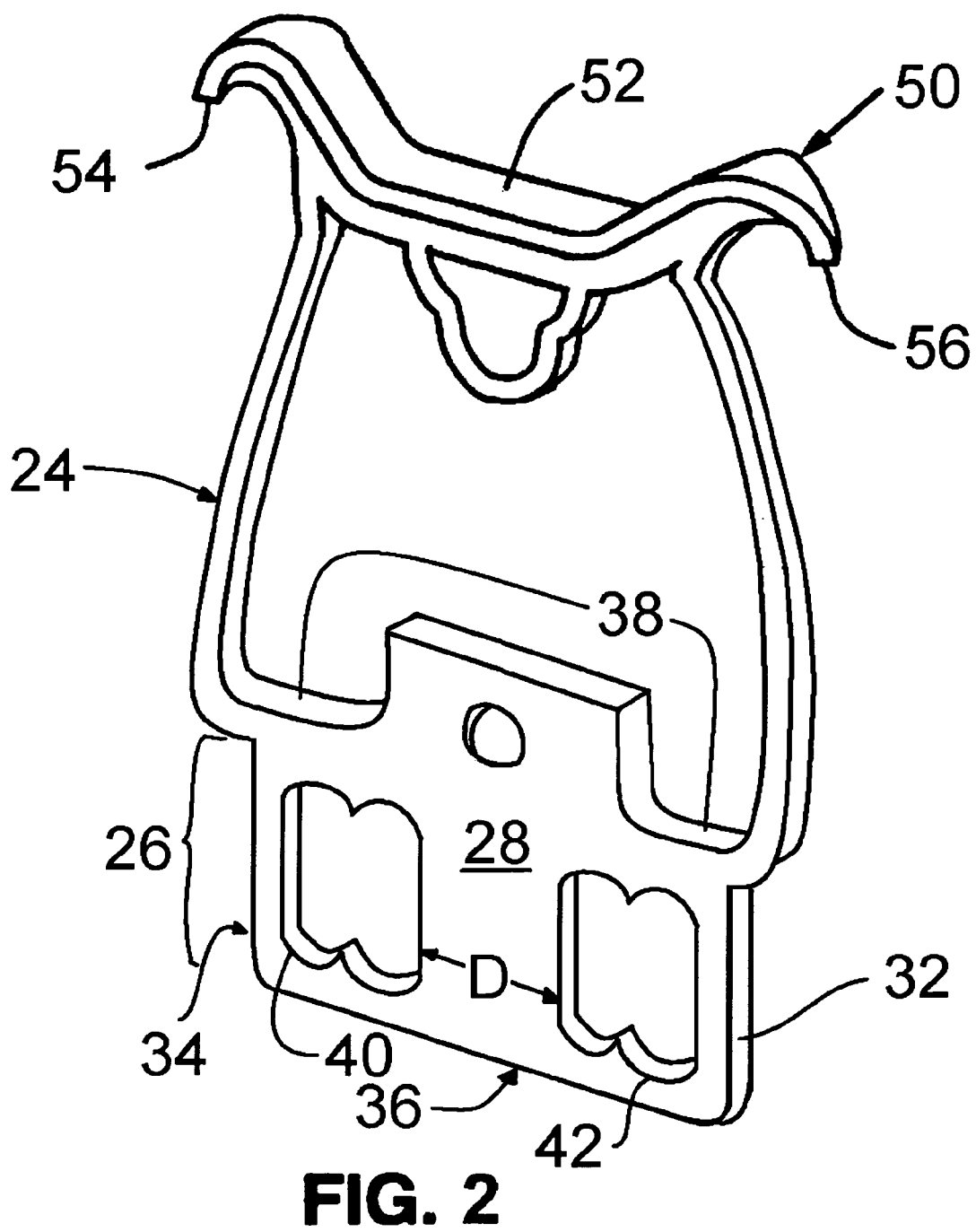
FIG. 2 is a perspective view of a first embodiment of the retainer of the present invention.
Figure 5A:
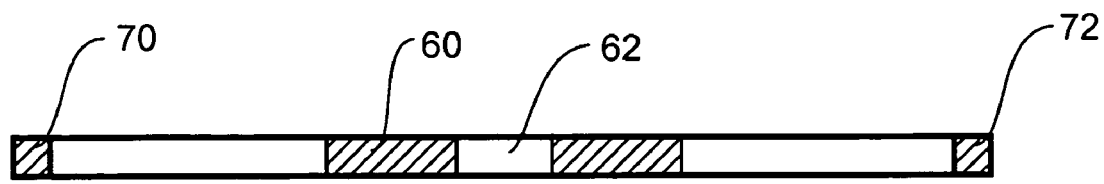
FIG. 5A is a partial top section view of a first tab portion of the present invention along line 5A of FIG. 3A.
Figure 5B:
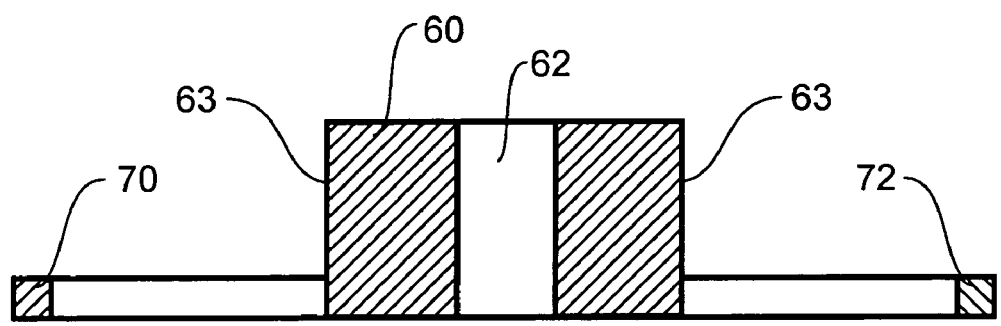
FIG. 5B is a partial top section view of a preferred first tab portion of the present invention along line 5A of FIG. 3A.
Figure 5C:
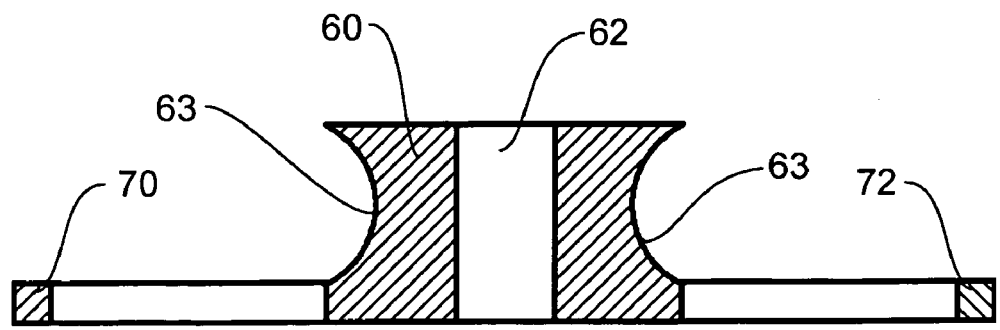
FIG. 5C is a partial top section view of a preferred first tab portion of the present invention along line 5A of FIG. 3A.
Figure 6:
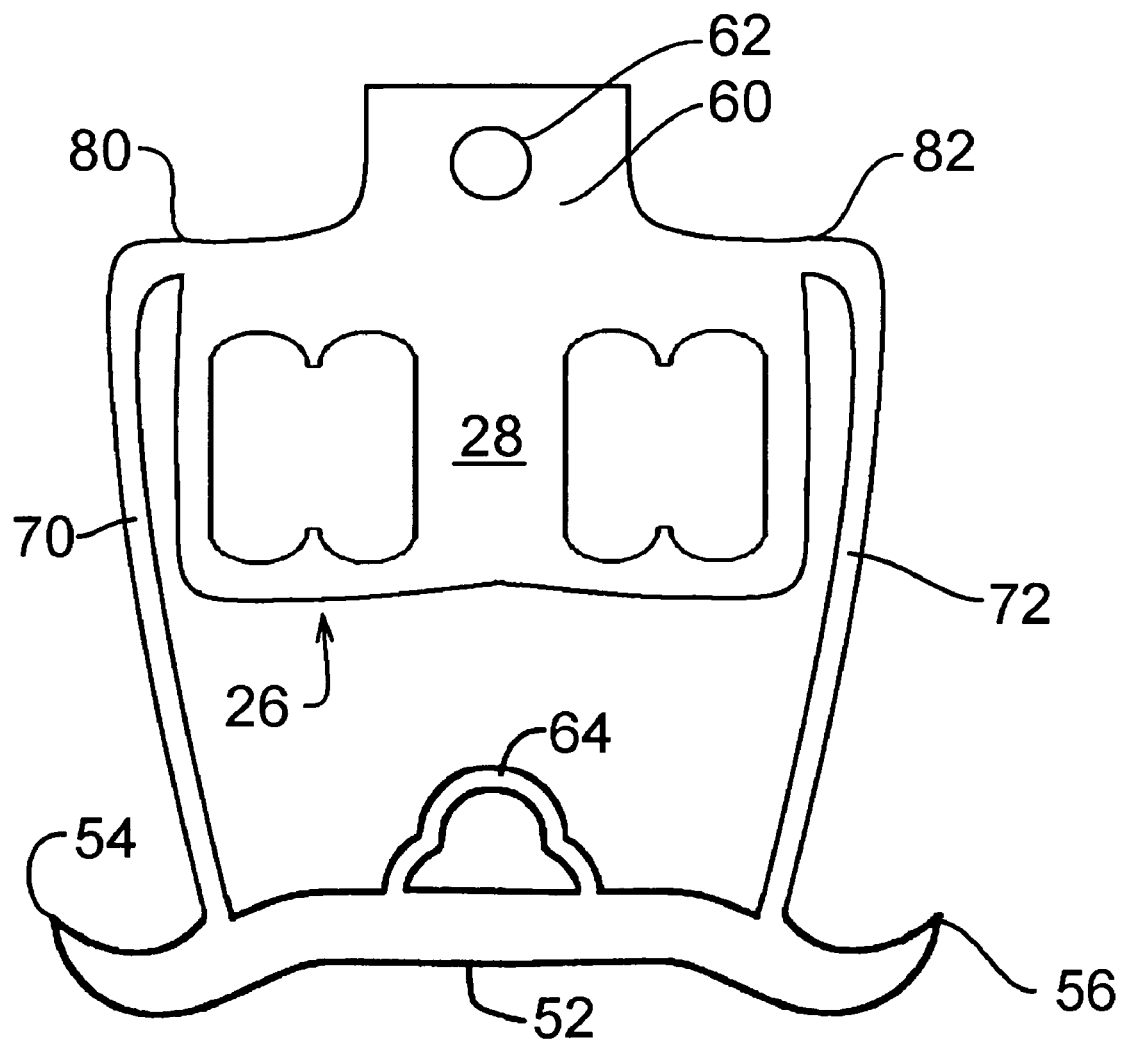
FIG. 6 is a front view of a retainer of the present invention in a pre-application state.
Figure 7:
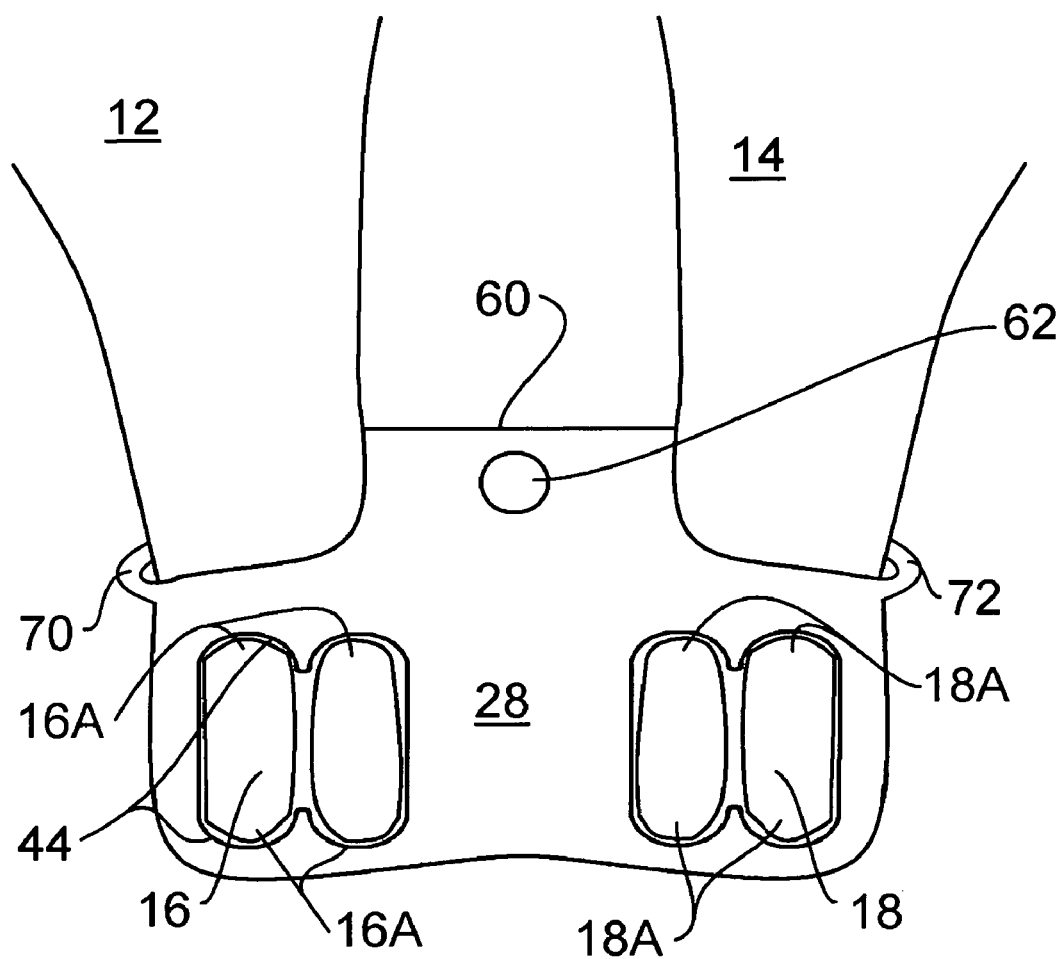
FIG. 7 is a front view of a retainer of the present invention in place on a representative poultry carcass.
Figure 8:
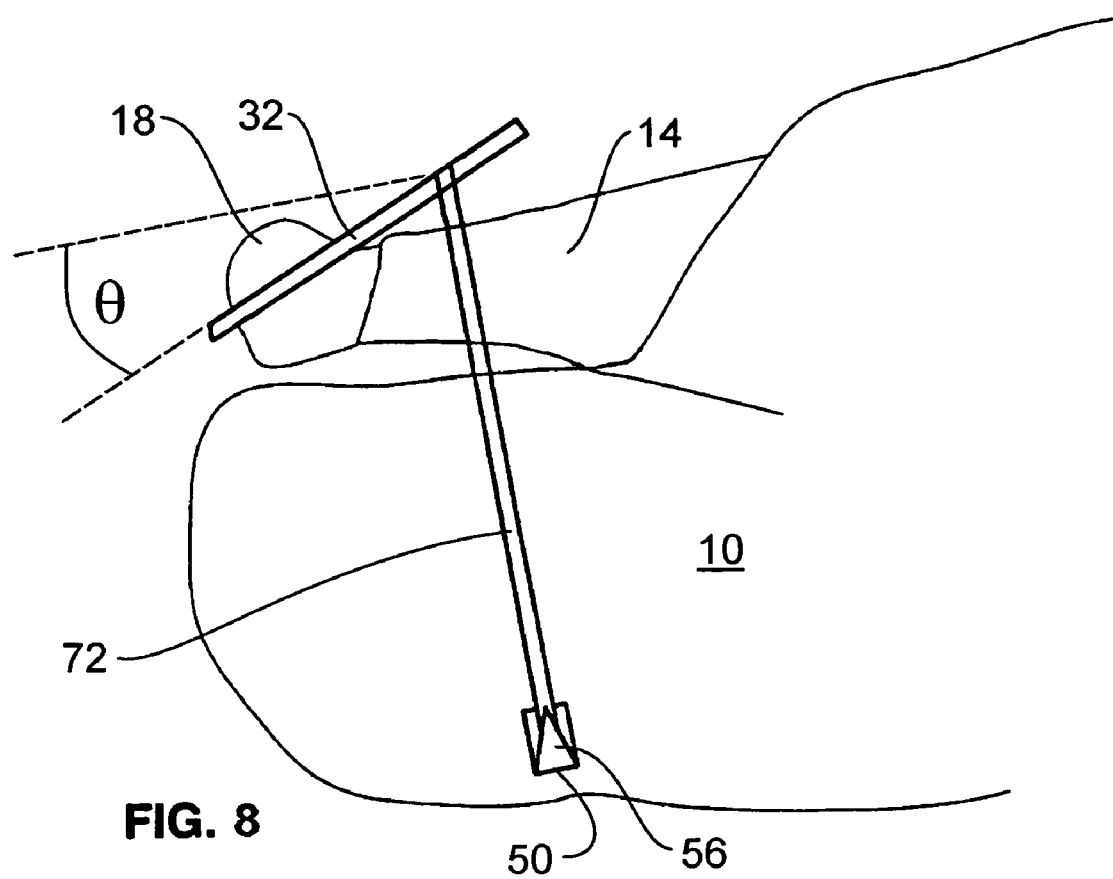
FIG. 8 is a schematic representation showing a side view of an embodiment of the retainer of the present invention in place on a poultry carcass.
Figure 9:
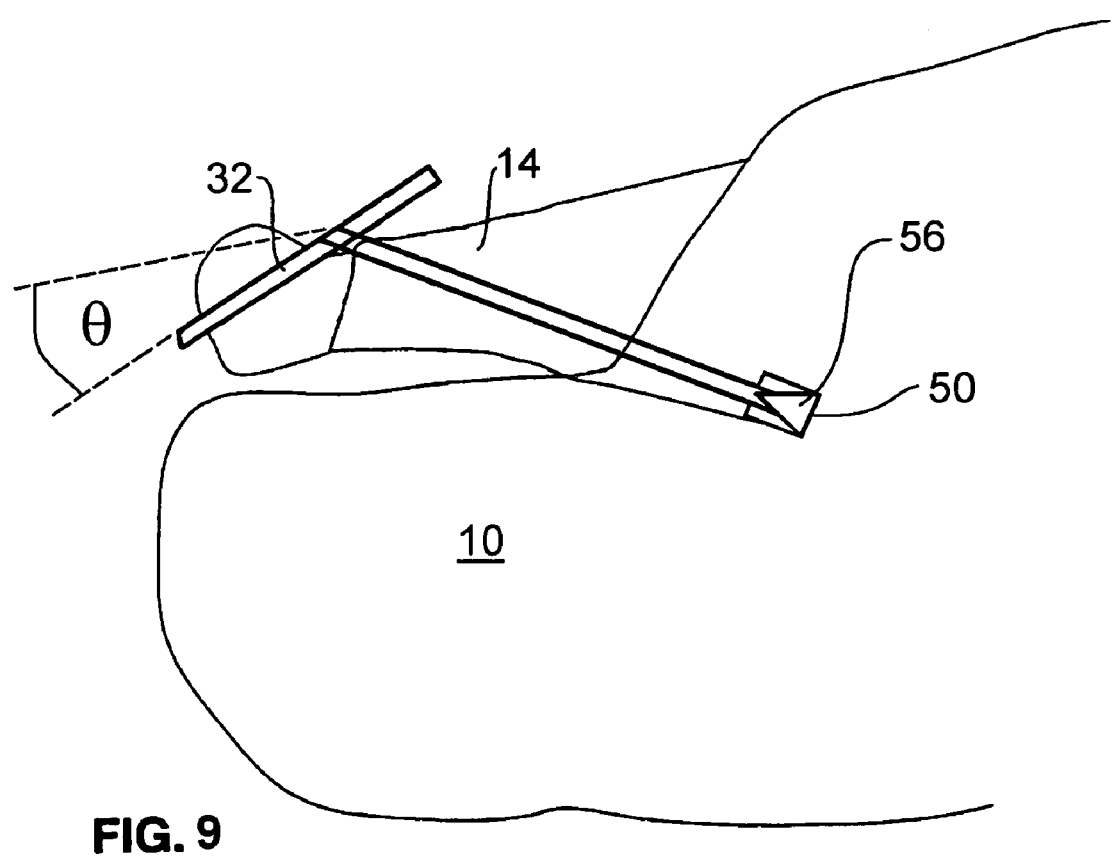
FIG. 9 is a schematic representation showing a side view of an embodiment of the retainer of the present invention in place on a poultry carcass.
Figure 10:
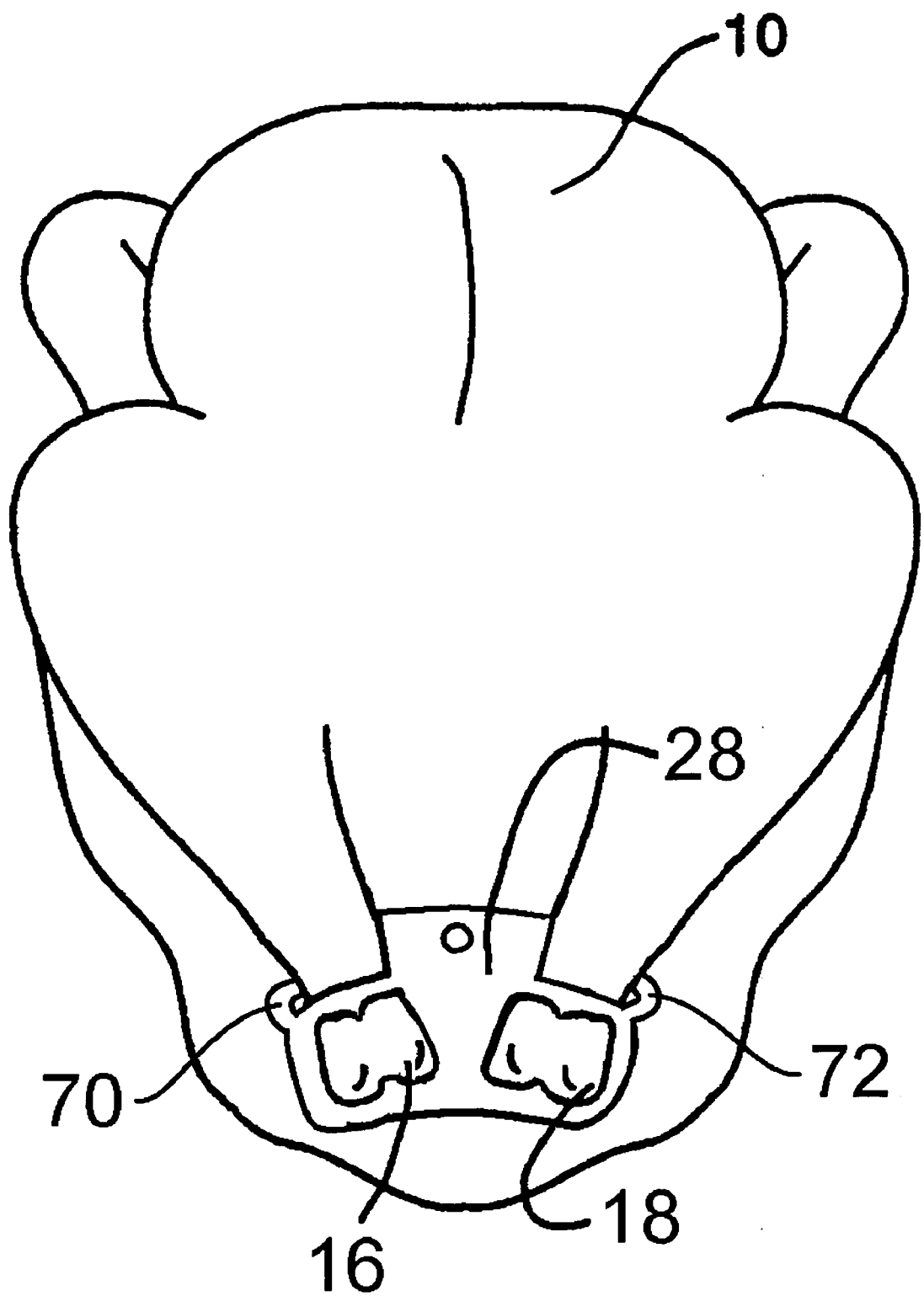
FIG. 10 is perspective view of the retainer of the present invention on the hocks of an exemplary poultry carcass.

Referring now generally to FIGS. 1–10, preferred embodiments of the invention are shown. FIG. 1 is a perspective view of an eviscerated poultry carcass 10 with an open abdominal cavity 20. The illustration shows the eviscerated poultry carcass 10 having legs 12, 14 with the feet removed, terminating in exposed hocks 16, 18, respectively. FIG. 2 is a perspective view of an embodiment of the retainer of the present invention. The illustration shows a trussing device 24 with hock retaining means 26. FIG. 3A is a front view of the retainer of FIG. 2. FIGS. 3B and 3C are front views of alternate embodiments the present invention. FIG. 4A and FIG. 4B are side views of retainers according to the present invention. FIG. 5A is a partial top section view of a first tab portion of the present invention. FIG. 5B and FIG. 5C are partial top section views of preferred embodiment first tab portions of the present invention. FIG. 6 is a front view of a retainer of the present invention in a pre-application state. FIG. 7 is a front view of a retainer of the present invention in place on a representative poultry carcass. FIG. 8 is a schematic representation showing a side view of an embodiment of the retainer of the present invention in place on a poultry carcass in a first anchoring direction, with the anchor within the tail section of the carcass. FIG. 9 is a schematic representation showing a side view of an embodiment of the retainer of the present invention in place on a poultry carcass in a second anchoring direction, with the anchor within the cavity of the carcass. FIG. 10 is perspective view of the present invention on the hocks of an exemplary poultry carcass.

The eviscerated poultry carcass shown generally as 10 in FIG. 1 has hocks 16, 18 of respective legs 12, 14. Trussing device 24 of the present invention, as shown in FIG. 2, has a hock retaining means 26 that is designed to hold together exposed hocks 16, 18 of poultry carcass 10 of FIG. 1, which can be particularly advantageous during processing, packaging, shipping, storing, and/or cooking. Hock retaining means 26 has a generally flat top surface 28 and side walls 32, 34, 36 and 38 that extend downwardly from top surface 28. Hock retaining means 26 also has two hock retaining openings 40, 42.

The device 24 may further include one or more anchor means 50 that may be provided with a bar 52 having curved and extending ends 54, 56 that permit the apparatus to be removably, but securely, attached to poultry carcass 10 (as represented in FIGS. 8 and 9 in order to hold hocks 16, 18 proximally in place). Extending ends 54, 56 may engage the interior side walls of the poultry carcass or tail portion of a poultry carcass so as to secure the device 24 to the carcass 10. A connecting means that may consist of one or more straps 70, 72 extends between anchoring means 50 and hock retaining means 26.

Figure 3A:
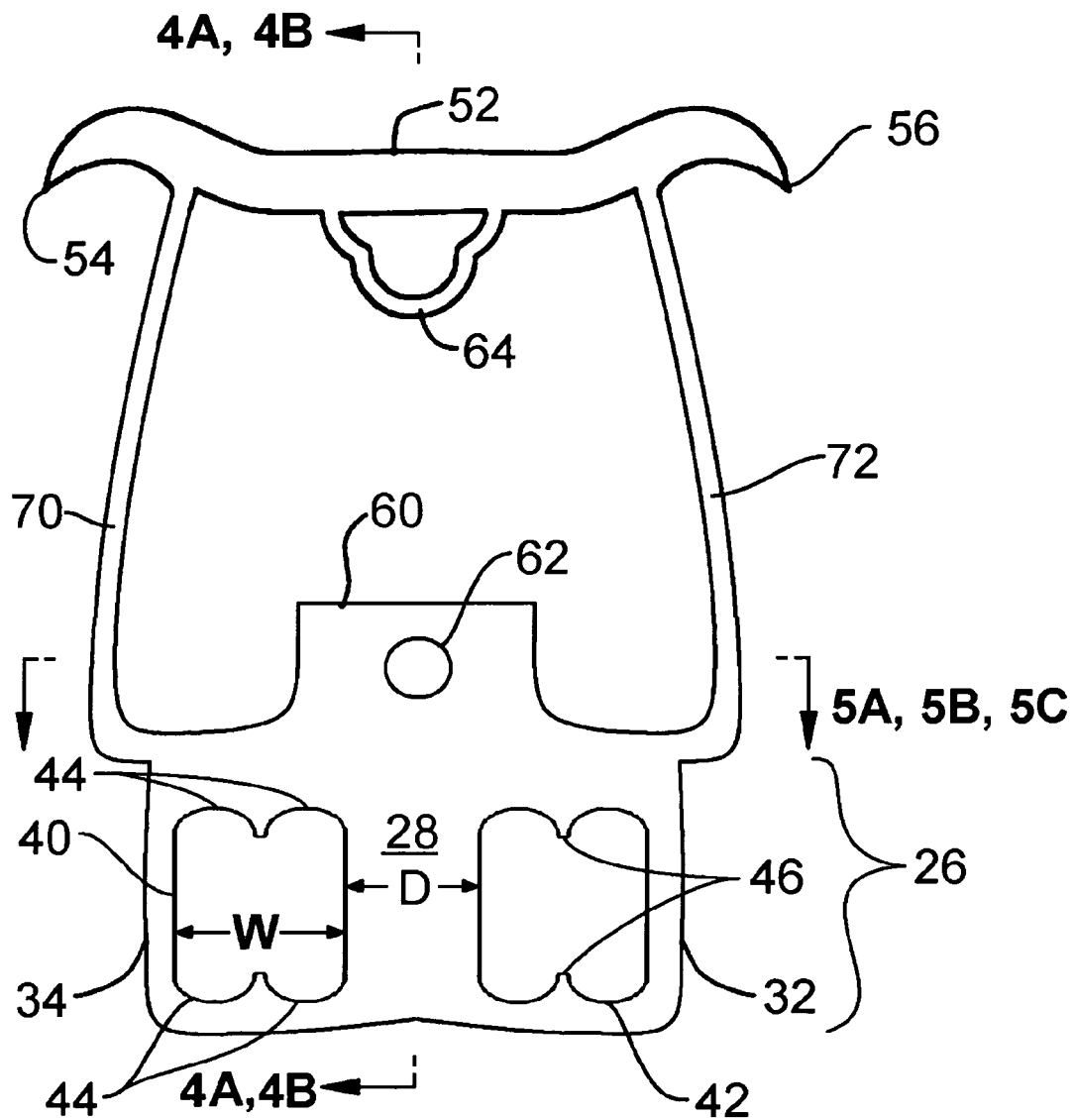
FIG. 3A is a front view of the retainer of FIG. 2.
Figure 3B:
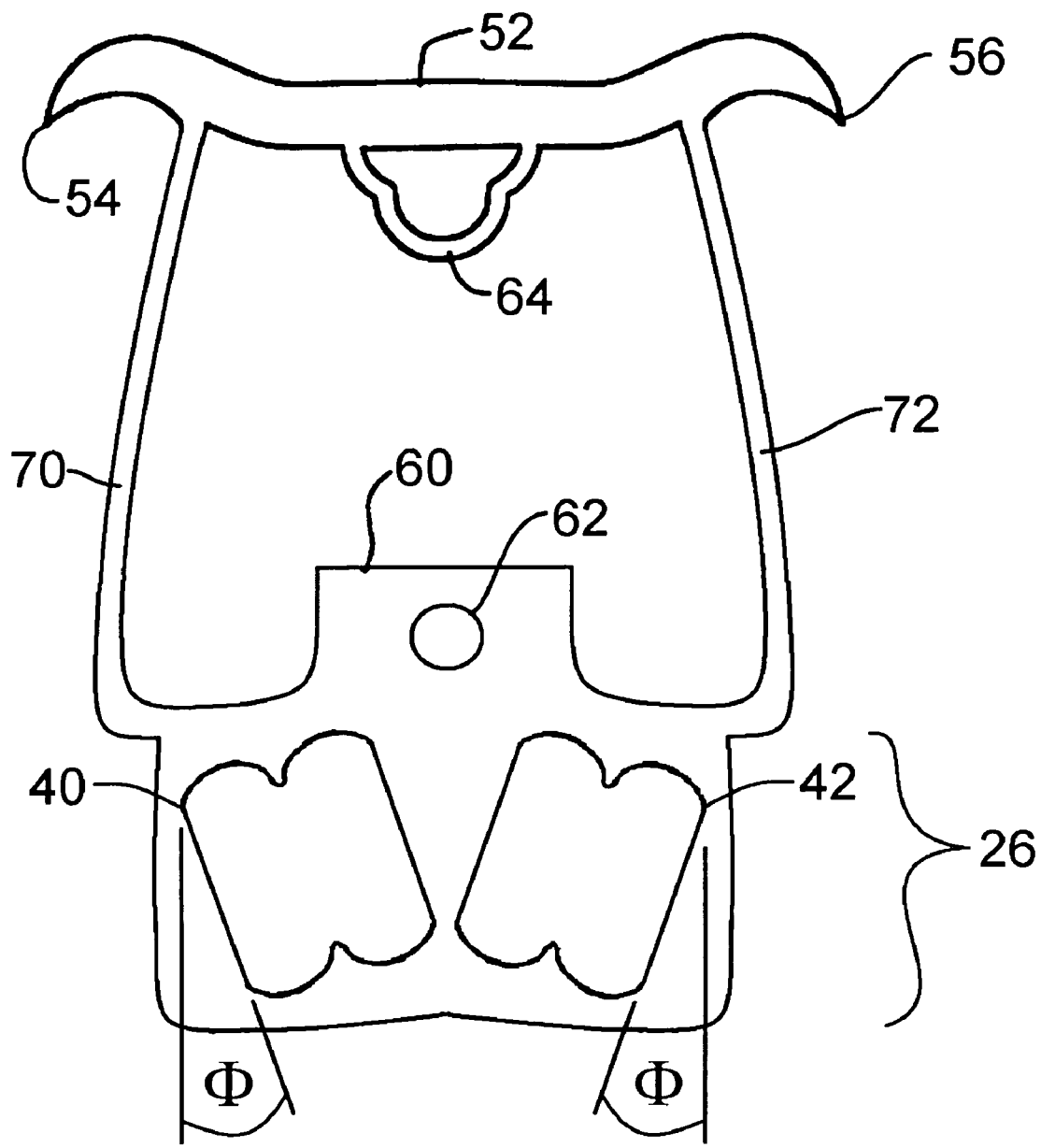
FIG. 3B is a front view of an alternate embodiment of the retainer of the present invention.

As shown in FIGS. 3A and 3B, each of hock retaining openings 40, 42 preferably includes one or more half-moon notches 44 for receiving hocks 16, 18. Half-moon notches 44 fit over the knuckles of hocks 16, 18. The exact shape and curvature of half-moon notches 44 will be dependent on the type of poultry hocks to be retained. Further, the positioning of end-points 46 of half-moon notches 44 within the dimples between the knuckles of hocks 16, 18 is similarly variable. As is appreciated by those skilled in the art, hock retaining means 26 can be manufactured in any number of sizes to be used with different size poultry, or in a single one-size-fits-all size to fit a wide variety of poultry. However, as most poultry carcasses fit within certain size categories, the device 24 as well as half-moon notches 44 can be manufactured in certain standard sizes so as to fit a high percentage of the carcasses 10.

Further, if hock retaining means 26 is meant to be used with smaller chickens or even quail or squab, a distance D measured between openings 40, 42 and/or width W (the width of openings 40, 42) can be narrower than if hock retaining means 26 is meant to be used with larger geese or turkeys. The length of openings 40, 42 also can be tailored to the poultry being trussed. Distance D also can depend upon the resilience of the plastic material from which hock retaining means 26 is formed. However, it is preferable that distance D be less than the smallest outside diameter of hocks 16, 18 to ensure that hocks 16, 18 remain snapped in place within hock retaining means 26 and also to save material costs.

In addition, distance D and width W can be selected depending on the relative amount freedom of motion desired of hocks 16, 18 within hock retaining means 26. If width W is larger than the diameter of hocks 16, 18, then hocks 16, 18 can have more relative freedom within hock retaining means 26, and thus move about more relative to each other (and, in extreme instances, hocks 16, 18 may be able to slip out of their respective opening 40, 42). Similarly, if width W is smaller than the diameter of hocks 16, 18, then hocks 16, 18 may have less relative freedom of motion within hock retaining means 26 (and hocks 16, 18 may not be fully seated within opening 40, 42). Width W is preferably about the same width of, or no more than approximately the width of, hocks 16, 18 as this size of width W can help ensure that hocks 16, 18 are secure within hock retaining means 26 and can help prevent hock retaining means 26 from slipping off.

The use of separate openings 40, 42, one for each of hocks 16, 18, has several advantages. One advantage is that each hock 16, 18 is retained separately from the other hock 16, 18, thus allowing a more secure retention. Another advantage is that hocks 16, 18 are prevented from overlapping each other, thus preventing damage to poultry carcass 10 and/or packaging. Another advantage is that openings 40, 42 need only be of the same relative size or diameter as a single hock 16, 18, thus preventing slippage while mounted.

As illustrated in FIG. 3B, openings 40, 42 may be rotated through an angle Φ in order to more accurately receive hocks 16, 18. It is understood that persons with skill in the art can determine the appropriate distance D and angle Φ based on factors related to the species of poultry and the type of material of manufacture.

A central first tab or first reinforced extension 60 may be present that also may include a first tab hole 62. First tab hole 62 can be used to reduce the quantity of material needed to produce trussing device 24 and to thus reduce the cost of truss device 24. The size and shape of first tab 60 and first tab hole 62 will depend on their purpose, as will be appreciated by those of skill in the art. It is also of note that first tab 60 can provide an excellent surface for advertising the name of the manufacturer of the truss device, or for other advertising purposes (flat top surface 28 also may be utilized for such purpose).

First tab 60 also may facilitate the manipulation required to insert hocks 16, 18 into hock retaining means 26 and to remove hocks 16, 18 from hock retaining means 26 in order to remove the device 24 from a poultry carcass 10. First tab 60 should be constructed of sufficient thickness that it can withstand the application of sufficient force for a person to apply hock retaining means 26 without causing damage to either hock retaining means 26 or to carcass 10. First tab 60 also preferably extends downward between, and positions itself around the inside of, the ankles of legs 12, 14 when applied to an eviscerated poultry carcass in order to further keep hocks 16, 18 in position relative to hock retaining means 26.

A second tab 64 also can be carried by bar 52 that can serve some of the same possible functions as first tab 60 and first tab hole 62. For example, second tab 64 may serve many ergonomic, mechanical, economic and/or other functions. For example, it can be used to facilitate stacking and storage of a plurality of trussing devices 24 and to keep them in alignment. Alternatively, second tab 64 may be structured so as to allow one or more trussing devices 24 to be loaded onto a magazine of a machine that automatically mounts retainers onto hocks. Alternatively, a cardboard runner for storing and organizing trussing devices 24 may be inserted through an opening in second tab 64. Also, second tab 64 can be used to facilitate insertion and removal of trussing device 24 from cavity 20 (shown in FIG. 1) of carcass 10 (shown in FIG. 1).

Figure 3C:
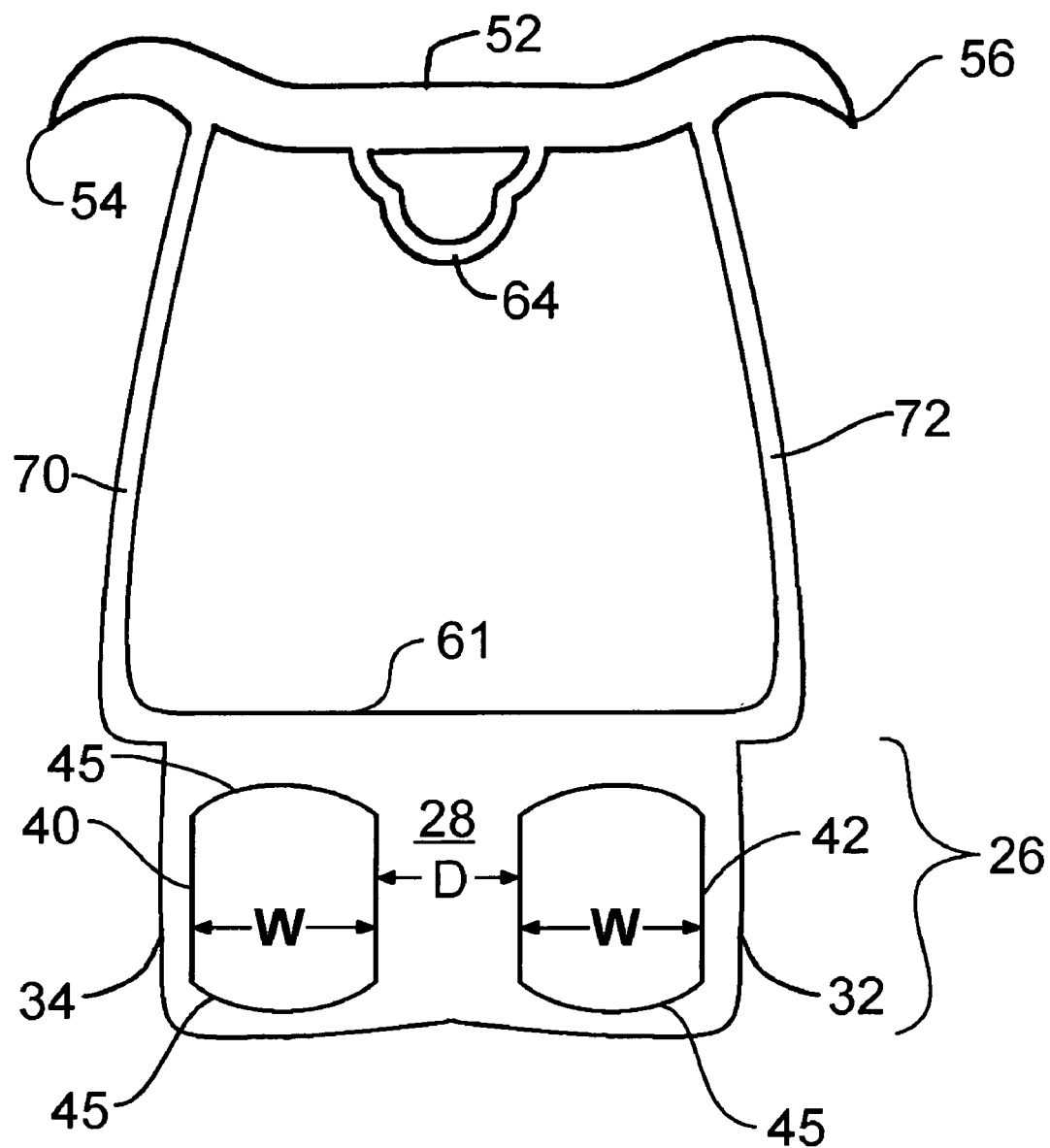
FIG. 3C is a front view of an alternate embodiment of the retainer of the present invention.

FIG. 3C illustrates an alternate embodiment for hock openings 40, 42 wherein their geometry is simplified from that of the half-moon notches 44 of FIGS. 3A and 3B to having only curved end surfaces 45. FIG. 3C also illustrates the hock retaining means 26 without tab 60 as designated by surface 61. Both end points 46 and tab 60 are optional.

FIGS. 4A and 4B illustrate side views of two embodiments of the present invention. Though it acceptable for the present invention to be constructed of uniform thickness for ease of manufacturing and stacking for shipment as in FIG. 4A, this is not required and the various portions may be constructed of any desired strength and thickness. Thus, although not shown, straps 70, 72 may be constructed of a smaller thickness than hock retaining portion 26. It is noted that because the purpose of hock retaining portion 26 is to hold hocks 16, 18 in place, it may be preferably constructed to be somewhat more rigid than straps 70, 72 that are to be somewhat flexible in their nature and purpose. Similarly, it is preferred that anchoring means 50 be somewhat rigid in order to hold its shape, particularly after insertion, in order to function properly.

The preferred material for the present invention is nylon with a thickness of hock retaining means 26 of up to approximately 0.30 inches, and preferably between 0.03 and 0.15 inches. This thickness range provides sufficient rigidity for hock retaining means 26 to retain its shape during and after shrink wrapping while permitting straps 70, 72 to be adequately deformable via their narrow cross-section, such that straps 70, 72 enable the invention to be folded in order to be inserted into poultry carcass 10. Plastics and other polymers also are suitable and can be selected by those of ordinary skill in the art based on the use of the device. For example, a high melting temperature material can be used for devices intended for use in cooking, while low melting temperature materials can be used for devices intended only for packaging and display.

FIG. 5A shows a top sectional view of the portion of the present invention relating to first tab 60 and it shows an embodiment wherein first tab 60 is constructed with the same thickness as the rest of hock retaining means 26 (including straps 70, 72), thereby being very economical to manufacture and requiring a relatively small amount of material. FIG. 5B shows a top sectional view of a preferred embodiment in which first tab 60 is wider than other portions of hock retaining means 26 and straps 70, 72. Though this embodiment requires more material and is somewhat more complicated to manufacture than the embodiment of FIG. 5A, a benefit is gained in that first tab 60 extends downward and can be inserted between legs 12, 14 of carcass 10 such that legs 12, 14 are prevented from moving inwards and/or touching once the device is in place. The surface that legs 12, 14 come into contact with is indicated by reference number 63 and may be termed as the impact surface. A top sectional view of another preferred embodiment is shown in FIG. 5C in which impact surface 63 is curved/contoured to receive legs 12, 14. Although this is the most complicated of these representative embodiments, it has an advantage in that it provides the most secure first tab 60 for receiving legs 12, 14 and for preventing their undesired movement, in that impact surface 63 is curved to fit the curve of the poultry leg bone.

FIG. 6 shows the present invention in a pre-application state wherein hock retaining means 26 has been pivoted 180° about connecting points 80, 82 of straps 70, 72, causing a twist in straps 70, 72. As straps 70, 72 have an elastic quality, straps 70, 72 desire to return to their untwisted position. Thus, because this is not the position of manufacture, hock retaining means 26 is urged by such twisting deformation to its original position. When device 24 is placed on hocks 16, 18, this urging forces hocks 16, 18 to maintain their position against carcass 10 and in juxtaposition to each other.

FIG. 7 illustrates hock retaining means 26 mounted on hocks 16, 18 on carcass 10 from the top (that is, when carcass 10 is lying on its back with the breast pointing upwards and wherein anchor means 50 is on the other side of legs 12, 14). This manner of mounting may be preferred for automatic mounting or if retaining means 26 is labeled with advertising or other information. As can be seen in this view, hocks 16, 18 fit within, but not through, respective openings 40, 42, with hock knuckles 16A, 18A fitting within half-moon notches 44. End-points 46 fit between hock knuckles 16A, 18A. The combination of openings 40, 42, notches 44, and end-points 46 cooperate to secure hocks 16, 18 within device 24. Further, tab 60 extends between legs 12, 14 to maintain a desired degree of separation between legs 12, 14 for better packaging, shipping and display.

Referring now to FIGS. 8 and 9, two alternative installations of the present invention are shown. FIG. 8 illustrates an embodiment of hock retaining means 26 in which anchor means 50 is received into a tail section of carcass 10 (shown in ghost lines) in a first anchoring direction. FIG. 9 illustrates an alternative installation in which anchor means 50 is received into abdominal cavity 20 of carcass 10 (shown in ghost lines) in a second anchoring direction. Angle θ is preferred to be between approximately 20° and 40°, and more preferably about 25°. This angle θ is preferred based upon research by the inventor that shows that this angle allows for optimum performance of the present invention, particularly for turkey carcasses, and that if a smaller angle θ is used, hocks 16, 18 are more likely to slip out of hock retaining means 26, or legs 12, 14 may hit the side of device 24. Extending ends 54, 56 contact the interior surface of carcass 10 to help anchor device 24 onto carcass 10.

FIG. 10 shows that an application of hock retaining means 26 to carcass 10 trusses hocks 16, 18 of carcass 10 together and helps maintain legs 12, 14 proximal to carcass 10. Preferably, hocks 16, 18 are juxtaposed at a reasonable distance dictated primarily by the proximity of openings 40, 42 to each other and the configuration of first tab 60. As openings 40, 42 have been sized so that hocks 16, 18 can fit therein, but not necessarily through, the poultry processor (or processing machine) can pinch hocks 16, 18 together and then either can snap hocks 16, 18 into openings 40, 42 or snap hock retaining means 26 over hocks 16, 18 with anchor means 50 secured into carcass 10 in a number of positions, two of which are shown in FIGS. 8 and 9. It is also important to note that the placement of hock retaining means 26 on hocks 16, 18 may occur before or even after the placement of anchor means 50.

Preferably, both hocks 16, 18 simultaneously enter openings 40, 42 respectively. Once hocks 16, 18 are substantially within openings 40, 42 and anchor means 50 is in position, straps 70, 72 will attempt to return to their original positions and, as they are prevented from doing so, they keep hocks 16, 18 and thereby legs 12, 14 in constant force and thereby held against carcass 10. Further, straps 70, 72 act like a spring and such that if a sudden jolt forces legs 12, 14 to rise, straps 70, 72 will react like a spring, thus providing a force to legs 12, 14 to return them to their original, proximal positioning. Such a system is particularly useful in the processing of poultry in which carcasses are tumbled in a spin chill to cool the poultry and unconstrained legs are apt to become damaged.

It is also contemplated that hock retaining means 26 can be loaded with a carcass 10 by automation. The generally plate-like configuration of hock retaining means 26 facilitates automation of the process and operation as these types of shapes can be fitted in a machine. More specifically, a machine can insert anchor means 50 into carcass 10, then deflect (twist or rotate by up to approximately 200°) hock retaining means 26, then move position hock retaining means 26 over hocks 16, 18, thus locking hocks 16, 18 into proximate position relative to carcass 10.

In another embodiment, hock retaining means 26 can also serve as a means for labeling or conveying information regarding carcass 10. Certain information pertaining to carcass 10 can be written on, imprinted on, or attached to hock retaining means 26. For example, hock retaining means 26 can be imprinted with information to indicate characteristics such as the type of the poultry or any flavoring added to the poultry. Additionally or alternatively, hock retaining means 26 can have a color to indicate the type and/or flavoring of carcass 10. To provide more space for labeling, surface 28 can be made of larger dimension.

The relatively simple structure of hock retaining means 26 can allow it to be manufactured relatively easily with inexpensive materials. Preferably, hock retaining means 26 can be molded from a single piece of resilient material that can withstand cooking and processing temperatures (which can approach and exceed 500° F.). Hock retaining means 26 can be formed of plastic or other resilient material that permits it to deflect and resume its original shape. Such plastics and other materials are evident to and known by those of skill in the art.

In operation, the trussing device of this invention may be applied to the carcasses as quickly and easily as any device presently on the market. The trussing device of the present invention affords a positive and secure mechanism to hold the hocks together.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A retainer for use with a poultry carcass having legs with hocks, the retainer comprising:
   hock retaining means including a first opening for retaining a first hock and a second opening for retaining a second hock from the poultry carcass, the hock retaining means retaining the first hock and the second hock in proximal juxtaposed relationship to each other;
   anchor means removably insertable into the poultry carcass; and
   connecting means between the hock retaining means and the anchor means, wherein the connecting means provides a spring force to keep the hock retaining means in relative position to the first hock, second hock, and the carcass, wherein the hock retaining means is rotatable up to approximately 200° from an original position relative to the anchor means so as to create the spring force.

2. The retainer of claim 1, wherein when the hocks are placed in the hock retaining means and the hock retaining means are released, the hock retaining means attempts to rotate back to the original position so as to maintain the hocks position against the carcass and in juxtaposition to each other.

3. The retainer of claim 2, wherein the hock retaining means is rotatable approximately 180° relative to the anchor means so as to create the spring force.

4. The retainer of claim 1, wherein the hock retaining means is rotatable approximately 180° relative to the anchor means so as to create the spring force.

5. The retainer of claim 1, wherein the first opening and the second opening include half-moon notches into which knuckles of the hocks fit.

6. The retainer of claim 5, further comprising a plurality of end-points, each of which lies between two adjacent of the half-moon notches, for fitting within dimples between the knuckles of the hocks.

7. The retainer of claim 6, wherein the first opening and the second opening each have a width no more than approximately the width of the hocks, whereby the combination of the first opening and the second opening with the respective half-moon notches and end-points cooperate to secure the hocks within, but not through, the first opening and the second opening, thereby securing the hocks within the hock retaining means.

8. The retainer of claim 1, further comprising a first tab that is insertable between a first leg and a second leg of the carcass wherein the first tab prevents the first leg and the second leg from moving inwardly relative to each other.

9. The retainer of claim 6, wherein two of the half-moon notches are assigned to each of the knuckles of the hocks.

10. The retainer of claim 1, wherein the retainer is made from a material capable of withstanding food-cooking temperatures.

11. The retainer of claim 1, wherein the retainer has a color indicating means.

12. A unitary retainer for use with a poultry carcass with a first hock and a second hock, comprising:

hock retaining means mounted on the carcass to receive the first hock and second hock such that the first hock and the second hock are juxtaposed to each other;

the first hock and second hock are each received into respective separate openings in the hock retaining means;

the openings include half-moon notches that are assigned to knuckles of the first hock and the second hock, wherein the openings each have a width no more than approximately the width of the hocks; and anchor means removably insertable into the poultry carcass; and connecting means between the hook retaining means and the anchor means, wherein the connecting means provides a spring force to keep the hook retaining means in relative position to the first hock, second hock, and the carcass, wherein the hock retaining means is rotatable up to approximately 200° from an original position relative to the anchor means so as to create the spring force.

13. The retainer of claim 12, wherein the hock retaining means is rotatable 180° from an original position relative to the anchor means.

14. The retainer of claim 13, wherein when the hocks are placed in the hock retaining means and the hock retaining means are released, the hock retaining means attempts to rotate back to the original position so as to maintain the hocks position against the carcass and in juxtaposition to each other.

15. The retainer of claim 14, further comprising a plurality of end-points, each of which lies between two adjacent half-moon notches on the openings, fit within dimples between knuckles of the first hock and the second hock, wherein the combination of the openings with the respective half-moon notches and end-points cooperate to secure the hocks within, but not through, the openings, thereby securing the hocks within the hock retaining means.

16. The retainer of claim 15 further comprising a first tab that is insertable between a first leg and a second leg of the carcass wherein the first tab prevents the first leg and the second leg from moving inwardly relative to each other.

17. The retainer of claim 16, wherein at least two of the half-moon notches are assigned to each of the knuckles of the hocks.

18. The retainer of claim 17, wherein the retainer is made from a material capable of withstanding food-cooking temperatures.

19. A unitary retainer for use with a poultry carcass with a first hock and a second hock, comprising:

hock retaining means mounted on the carcass to receive the first hock and second hock such that the first hock and the second hock are juxtaposed to each other;

the first hock and second hock are each received into respective separate openings in the hock retaining means;

the openings include half-moon notches that are assigned to knuckles of the first hock and the second hock, wherein the openings each have a width no more than approximately the width of the hocks;

anchor means removably insertable into the poultry carcass; and connecting means between the hock retaining means and the anchor means, wherein the connecting means provides a spring force to keep the hock retaining means in relative position to the first hock, second hock, and the carcass, wherein the hock retaining means is rotatable 180° from an original position relative to the anchor means and when the hocks are placed in the hock retaining means and the hock retaining means are released, the hock retaining means attempts to rotate back to the original position so as to maintain the hocks position against the carcass and in juxtaposition to each other.

* * * * *